Dec. 28, 1948.                    G. W. BRADY                    2,457,202
                   METHOD OF MAKING INTERNALLY REINFORCED
                             HOLLOW PROPELLER BLADES
Filed Sept. 7, 1944                                        3 Sheets-Sheet 1

INVENTOR
George W. Brady
BY
ATTORNEY

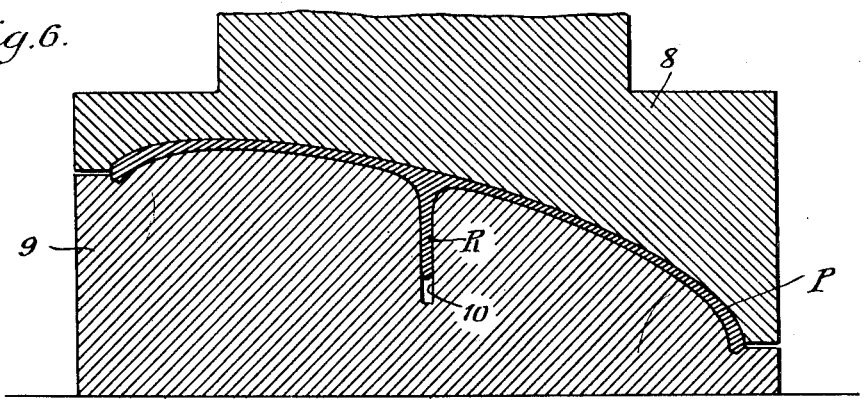
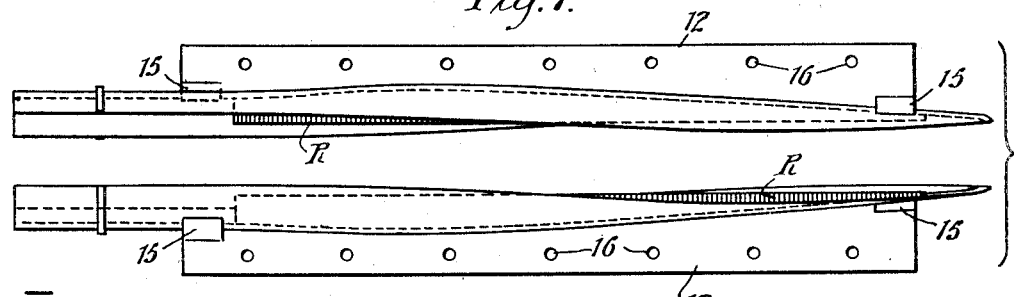
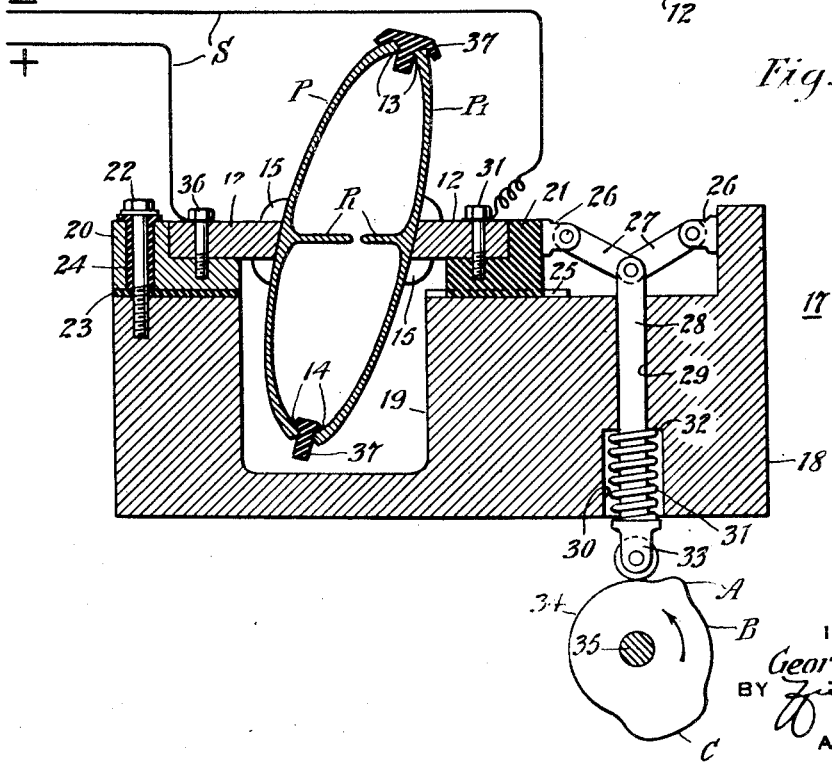
INVENTOR
George W. Brady
BY
ATTORNEY

Dec. 28, 1948.  G. W. BRADY  2,457,202
METHOD OF MAKING INTERNALLY REINFORCED
HOLLOW PROPELLER BLADES
Filed Sept. 7, 1944   3 Sheets-Sheet 3

INVENTOR
George W. Brady
BY
ATTORNEY

Patented Dec. 28, 1948

2,457,202

UNITED STATES PATENT OFFICE 2,457,202

METHOD OF MAKING INTERNALLY REINFORCED HOLLOW PROPELLER BLADES

George W. Brady, Upper Montclair, N. J., assignor to Curtiss-Wright Corporation, a corporation of Delaware Application September 7, 1944, Serial No. 553,094

1 Claim. (Cl. 29—156.8)

This invention relates to a method of making propeller blades and more particularly to hollow propeller blades which are internally reinforced.

The invention relates more particularly to a method of making a blade construction comprising a pair of plates, the leading and trailing edges thereof welded or otherwise secured together. Moreover, each plate includes a longitudinally extending reinforcing member or rib formed preferably, although not necessarily, integrally therewith, said reinforcing members being adapted to be secured together throughout at least a part of the length thereof by a flash-welding operation.

Various other objects, advantages and features of the invention will become apparent from the following detailed description.

For an understanding of the invention and for an illustration of one of the forms thereof, reference is to be had to the accompanying drawings, in which:

Figs. 1 and 2 are plan views showing propeller plates each having a longitudinally extending, integral reinforcing rib intermediate the marginal edges thereof;

Figs. 3, 4 and 5 are transverse sectional views taken on the respective lines 3—3, 4—4 and 5—5 of Fig. 1;

Fig. 6 is a transverse sectional view of a two-part pressure die with one of the blade-forming plates therebetween and illustrating the manner in which the plate reinforcing rib is held in a single plane while the pitch angle or twist is imparted to the plate;

Fig. 7 is a plan view of the respective blade-forming plate members with a supporting bar temporarily attached to each plate preparatory to joining said plates intermediate their marginal edges by a flash-weld;

Fig. 8 is a transverse sectional view of a flash-welding jig illustrating more or less schematically the manner in which the respective plates are supported and secured thereto for the purpose of joining said plates intermediate their edges by a flash-welding operation;

Figure 9:
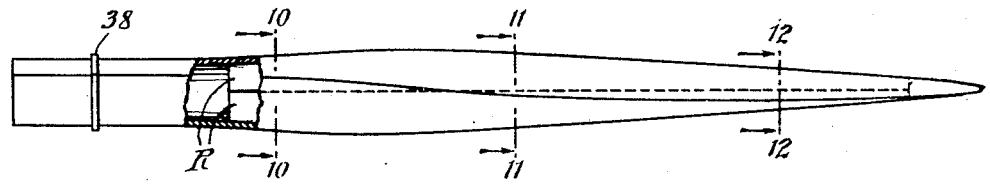
Figure 10:
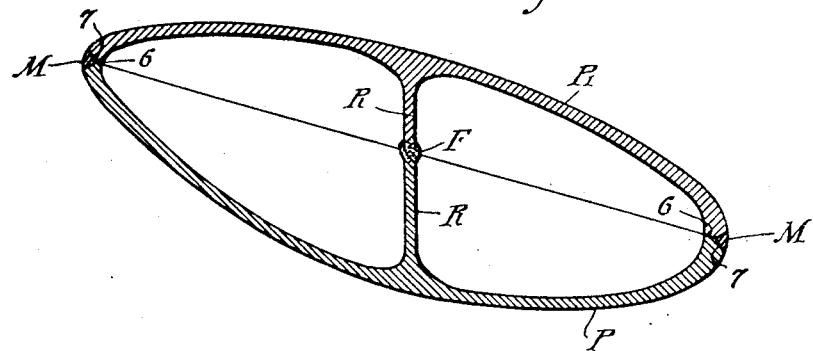
Figure 11:
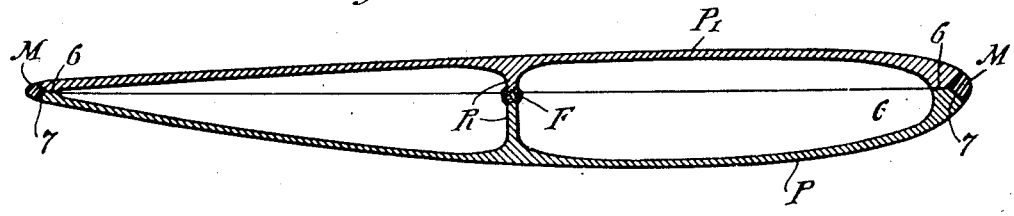
Figure 12:
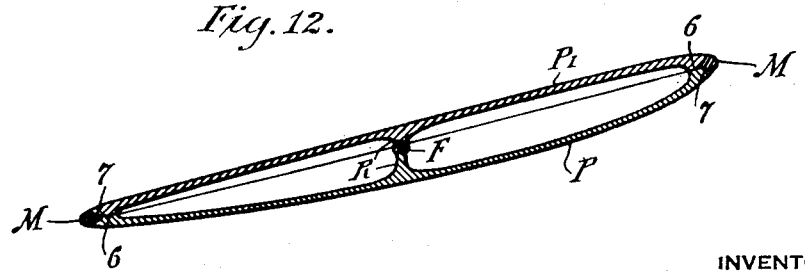

Fig. 9 is a plan view showing a propeller blade constructed in accordance with the invention; and Figs. 10, 11 and 12 are transverse sectional views taken on the respective lines 10—10, 11—11 and 12—12 of Fig. 9.

Referring to Figs. 1, 3, 4 and 5, a plate or plate member P is illustrated which is formed preferably from metal and which is free from twist. The plate P comprises a semi-cylindrical shank 1 merging into the plate proper indicated at 2 which generally is of convex configuration and symmetrical with respect to the longitudinal center line of the plate P, the convexity decreasing in a progressive manner as the tip of the said plate is approached. As illustrated, the plate P is tapered in a direction extending toward the tip thereof and it has minimum thickness midway between its edges along said center line, the thickness increasing toward the respective edges of said plate P. The plate P, throughout its entire margin, comprises a flat surface 6 which lies substantially in a single plane. The flat surface 6 is joined, in angular relation, by a flat surface 7.

Figure 2:
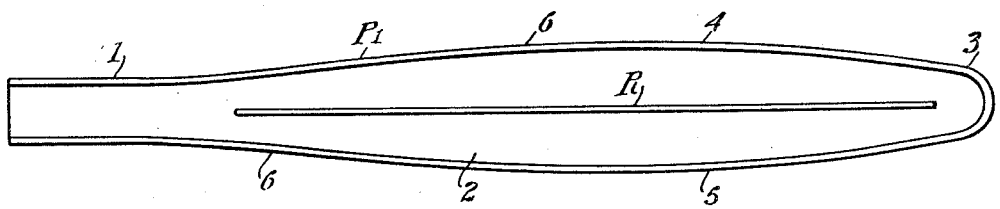
Figure 3:
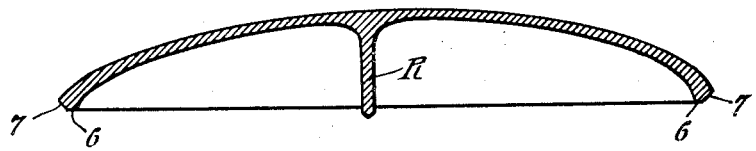
Figure 4:
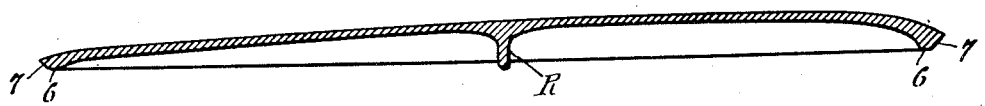
Figure 5:
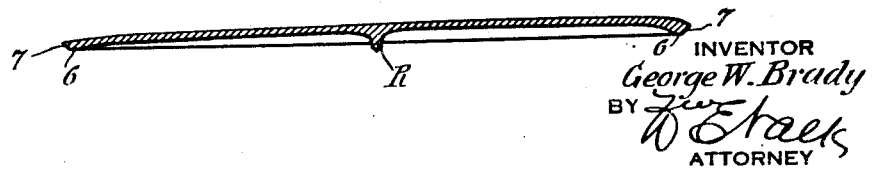

In Fig. 2, there is shown a plate or plate member P1 which is a duplicate, or substantially so, of the plate P with the exception that it is of opposite hand.

As shown and described in copending application Serial No. 525,734, filed March 9, 1944, now Patent No. 2,430,390, dated November 4, 1947, the plates P and P1 are each provided with a longitudinally extending, complementary reinforcing member or rib R which, preferably although not necessarily, is hot forge-rolled in a known manner, to a desired height and thickness as an integral part of each plate. Under certain circumstances, the height of the rib R formed on one of the plates may be greater than the height of the rib R formed on the other plate.

Figure 1:
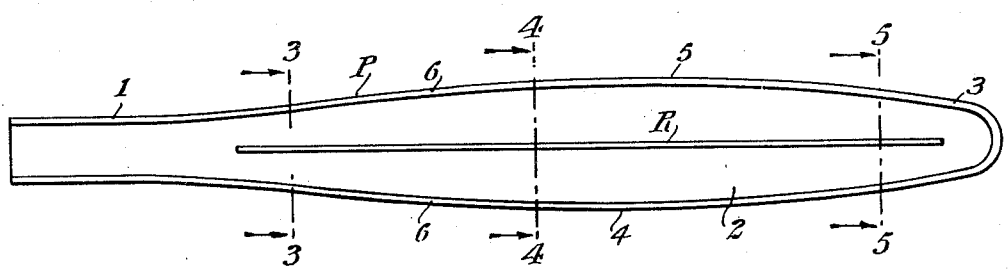

In lieu of integral ribs, it will be understood that they may be separately attached to the respective plate P and P1, as by welding or otherwise, said plates being thereafter hot or cold pressed to impart a substantially convex configuration thereto and, subsequently, individually trimmed to the shape illustrated in Figs. 1 and 2.

With the plates P, P1 in the condition described, each of them is subjected to further operations wherein all the pitch angle or twist is imparted thereto while maintaining the reinforcing rib R in a single plane throughout the length of each. This is accomplished, for example, by means of a suitable two-part pressure die, indicated at 8 and 9, Fig. 6, wherein the lower die member 9 is provided with a central, longitudinally extending straight-line slot 10 having such depth and width that it is adapted to receive the reinforcing rib R, when the plate P is placed between the die members 8 and 9. Inasmuch as the plate P may constitute the camber plate and the plate P1 the thrust plate of the final propeller blade constructed in accordance with the present invention, two different dies are required for imparting the pitch angle or twist to the respective plates P and P1 as will be understood.

After the desired pitch angle or twist has been imparted to the plates P and P1, each of them has associated therewith a bar-like member 12, preferably although not necessarily, of copper, brass or phosphor bronze whereby said plates may be individually supported and secured for the purpose of the flash-welding operation hereinafter described. To this end, a supporting bar 12 is temporarily secured to each plate lengthwise along the outer surface and intermediate the marginal edges 13 and 14 thereof by a suitable soft solder, silver or brass spelter. The length of the supporting bars 12 is such that they extend along the respective plates P, P1 from a point adjacent the shank end to a point adjacent the tip end of each. The supporting bars 12 are rectangular in cross-section and each is provided with a pair of oppositely extending positioning pads 15 at each end thereof, the inner or plate-contacting surface of said pads 15 being of such contour that they substantially match the convexity of the outer plate surface. Moreover, the plate-contacting inner face of each supporting bar 12 tapers substantially in accordance with the outer plate surface to which it is temporarily attached, as clearly shown in Fig. 7. Each bar member 12 is also provided with a plurality of longitudinally spaced openings or holes 16 whereby said bar members 12 may be securely bolted in a flash-welding jig 17 as clearly shown in Fig. 8.

In addition to providing a convenient means for supporting the aforesaid plate members in the welding jig 17, the supporting bars 12 also serve as conductors whereby electric current is transmitted to each plate P and P1 during the flash-welding of the plate reinforcing ribs R as hereinafter described.

As shown more or less schematically in Fig. 8, the flash-welding jig 17 comprises a suitable base 18 having a recess 19 formed longitudinally and substantially intermediate its side edges whereby to afford clearance for the aforesaid plates P and P1 during the flash-welding operation.

Means for securing the plates to the base 18 comprises a fixed block 20 and a movable block 21, the fixed block 20 being secured to the upper face of the base 18 by a plurality of bolts 22, a suitable pad or block of insulation material 23 being interposed between the base 18 and the block 20. The bolts 22, passing through the block 20, are insulated therefrom by bushings 24 of suitable insulation material as will be understood. The movable block 21 is disposed on the upper face of the base 18 in opposite parallel relation to the fixed block 20 by suitable gib plates or a complementary dove-tailed arrangement, as indicated at 25, whereby said block 21 is adapted for limited movement relative to said base 18 and the fixed block 20. Inasmuch as the block 21 is adapted to be moved relatively to the base 18, as aforesaid, fixed electrical contacts are preferably established by suitably attaching a pair of conductors S directly to the respective plate supporting bars 12 as shown. For this reason, the movable block 21 is formed of suitable insulation material to insulate the same from the base 18 as will be understood.

The movable block 21 and the base 18 are each provided with a suitable clevis bracket 26 for the pivotal reception of a pair of toggle links 27 which, in turn, are connected to a vertically reciprocable actuating member 28 slidable in a bore 29 provided therefor in the aforesaid base 18. The lowermost end portion of the bore 29 is preferably suitably counterbored, as at 30, to provide a clearance recess for a coil spring 31 disposed about said actuating member 28 and between a shoulder 32, formed by said counterbore 30, and a roller bracket 33 suitably attached to the lower end of the aforesaid actuating member 28.

As also shown more or less schematically in Fig. 8, a suitable cam 34, carried by a drivable shaft 35, cooperates with the roller of the bracket 33, the design of the cam 34 being such that suitable time intervals are provided for movements of the movable block 21 with respect to the fixed block 20.

Preparatory to the welding operation, the plates P and P1, with the ribs R in spaced facing relation, are secured, respectively, to the fixed block 20 and to the movable block 21 by the associated supporting bars 12, a plurality of stud bolts 36 being utilized to retain said bars 12 in position and a suitable block of insulation material 37 being positioned between each set of opposed marginal plate edges to prevent passage of electrical energy therebetween during the welding operation.

Preferably, each rib R has such height that it projects to slight extent beyond the plane of the aforesaid surface 6 of the plate with which the rib is associated. Further, when said plates P and P1 are positioned in spaced, parallel facing relation preparatory to the welding operation, it is desirable that the rib arrangement be such that the facing surfaces of the ribs are not exactly parallel. Thus, it is desirable that such facing surfaces are closest to each other at the "inboard" or shank region of the blade construction and that they taper or recede from each other in a direction extending toward the tip of said blade construction. Accordingly, when the plates P and P1 are moved toward each other, as hereafter described, the reinforcing ribs R contact each other initially at their shank ends.

When the plates P and P1 are thus positioned in the jig 17 and a source of electrical energy connected thereto by the conductors S, rotation of the cam 34 in the direction of the arrow, Fig. 7, causes the cam surface A to elevate the member 28 against the spring 31 and thus move the block 21 and the plate P1 secured thereto toward the other plate P to bring the reinforcing ribs into momentary contacting engagement only at the ends thereof adjacent the shank of the blade construction. Accordingly, electrical current flows through the plates P and P1 and the engaged surfaces of the ribs R with resultant establishment of an arc at said engaged rib surfaces.

Immediately thereafter, the surface B of the cam 34 permits limited separation of the ribs R and, while said surface B of the cam 34 is effective, the previously established arc moves toward and arrives at the end of the ribs adjacent the tip of the blade construction, this arc causing the facing surfaces of the ribs R to heat and become somewhat plastic, the arc also burning away uneven points or edges along the rib surfaces to be joined.

Subsequently, the cam surface C raises the aforesaid member 28 to greater extent than it was raised by the cam surface A with the result that facing surfaces of the ribs R are brought into engagement throughout the entire length thereof whereby the plasticized facing rib surfaces are engaged under pressure and upset to some extent. By said cam surface C, the ribs R are thus forcefully engaged and so held during the interval that the roller of bracket 33 is in contact with the cam surface C. The flash-welding operation is completed under the control of the cam surface C and, when the latter moves beyond the aforesaid roller of bracket 33, the energizing electrical circuit may be opened and the weld permitted to cool. Thereafter, the plates P and P1, which are now joined together by the ribs R, are removed from the jig 17 and the supporting bars 12 detached therefrom.

The subsequent withdrawal of the previously inserted blocks of insulation material 37 from between the marginal plate edges presents no problem since, after the welding of the ribs, the leading and trailing edges of the plates P and P1 will spring together whereby the surfaces 6 of the respective plates P and P1 will assume a position of contacting engagement.

After the plates P and P1 have been joined by a flash-weld as aforesaid, the resulting flash or upset extrusion is removed and this may be done in the following manner which is cited merely as one example since other mechanical or chemical methods may be employed. In the removal of the flash, above mentioned, the centrally joined plate members are secured to a suitable support either in a vertical or horizontal position. When so secured and with the leading and trailing edges held separated, a suitable mandrel-like member having its free end provided with suitable cutter, shear, grinding, abrading or other metal working arrangement, may be inserted between said edges and into contact with said flash-weld and then drawn along one side of the rib juncture. Alternatively, two mandrel-like members may be utilized to clean both sides of the rib juncture F simultaneously as will be understood. Thus, as said mandrels are drawn relative to said joined plates P, P1, the flash or upset extrusion is readily and completely removed in one or more operations as necessary.

With the plates P and P1 joined by the ribs R as described, the surfaces 6 are in engagement with each other. Further, throughout the lengths of the engaging surfaces 6, the aforesaid surfaces 7 are angularly related to each other to thereby form channels utilizable for the reception of weld metal M which may be deposited therein in any suitable manner. Thereafter, the blade construction is brought substantially to its complete state by grinding away or otherwise removing excess material, welding or upsetting a cuff ring 38 on the shank 1 of the blade construction C and subjecting said shank as then existing to an upsetting operation as known in the art to thereby produce the blade construction shown in Fig. 9.

While the present invention has been illustrated and described as applicable to blade-forming plates of a particular construction, it is to be understood that the invention is applicable to blade-forming plates of other types, for example, as shown in U. S. Letters Patent No. 2,214,338 wherein the entire shank-forming portion is an integral part of one plate known in the art as the camber plate, the other plate being known as the thrust plate and being devoid of a shank-forming portion, the thrust plate being utilizable as a closure plate for the chamber plate whereby a complete hollow propeller blade may be formed.

Blade-forming plates, as shown in the aforesaid Letters Patent, may also be reinforced with longitudinal ribs, respectively, and said ribs held in straight-line relation during the process of imparting pitch twist to each blade-forming plate in accordance with the present invention.

A prominent feature of the present invention resides in the provision of a rib R on each plate which has plane, twist-free configuration throughout its entire length. Accordingly, when said ribs R are brought into engagement for the flash-welding operation, adjacent surfaces are in true facing relation or, in other words, both ribs occupy and remain in a single plane when relative movement is effected between them during the flash-welding operation. This is highly desirable because providing a desirable condition for high grade welding and insuring a satisfactory finished product.

Although a particular arrangement has been disclosed for obtaining the aforesaid plane ribs R, it shall be understood that a plate having twist-configuration and carrying a plane rib may be constructed in various other ways as will be obvious to those skilled in the art.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

The method of producing an internally reinforced hollow metal propeller blade from two preformed arched plates each of which is provided on its concave face with a substantially central integral longitudinally extending rib portion of substantial length and of a height to bring its edge beyond a transverse line joining the rib edges which consists in so mounting said plates, one each, with their concave faces disposed toward one another, on the opposed relatively movable portions of a press so as to align the edges thereof and the edges of said rib portions respectively in placing between said opposed plate edges a strip of insulating material to prevent contact between said edges as said press portions are moved toward one another; in so moving said press portions toward one another as to bring the edges of said rib portions into contact with one another notwithstanding the fact that the plate edges are held apart by said insulating strip; in passing an electric welding current through the contacting rib portions so as to produce a flash welded elastic joint therebetween; in further pressing said rib portions together to produce a rib height of such magnitude that said plate edges would be in substantial contact with one another were they not held apart by said strips of insulating material; in thereafter, and only after the rib portions are welded together, removing said insulating strip so as to admit of said plate edges, due to the inherent resiliency of the metal of said plates, springing into contact with one another; and in thereafter uniting the contacting edges of said plates.

GEORGE W. BRADY.

REFERENCES CITED

The following references are of record in the file of this patent:

UNITED STATES PATENTS

| Number | Name | Date |
|---|---|---|
| 928,701 | Reitzel | July 20, 1909 |
| 994,166 | Kienast | June 6, 1911 |
| 1,093,568 | Achilles | April 14, 1914 |
| 1,828,340 | Reed | Oct. 20, 1931 |
| 1,937,966 | Junkers | Dec. 5, 1933 |
| 2,214,338 | McKee | Sept. 10, 1940 |
| 2,214,339 | McKee | Sept. 10, 1940 |
| 2,401,243 | Heath | May 28, 1946 |
| 2,403,076 | Heath | July 2, 1946 |

OTHER REFERENCES

Welding Encyclopedia (11th edition) 1943, page 565.

The Welding Engineer Publishing Co., 506 South Wabash Avenue, Chicago, Illinois.